Figure 1:
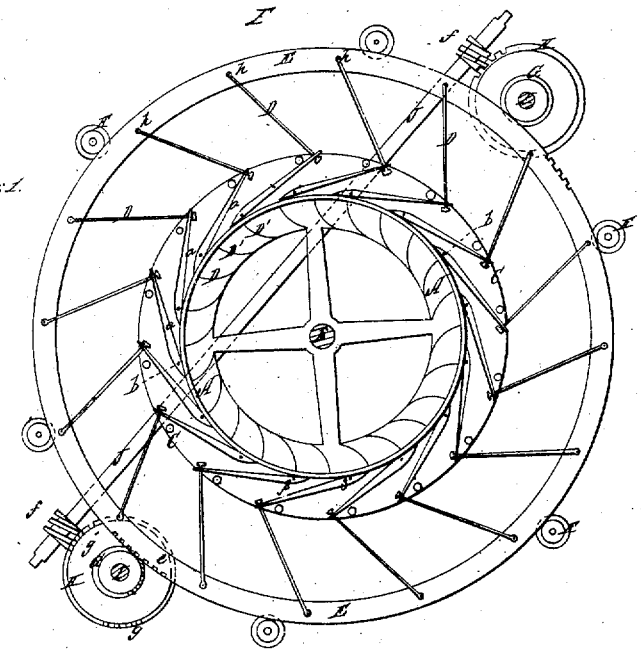
Figure 2:
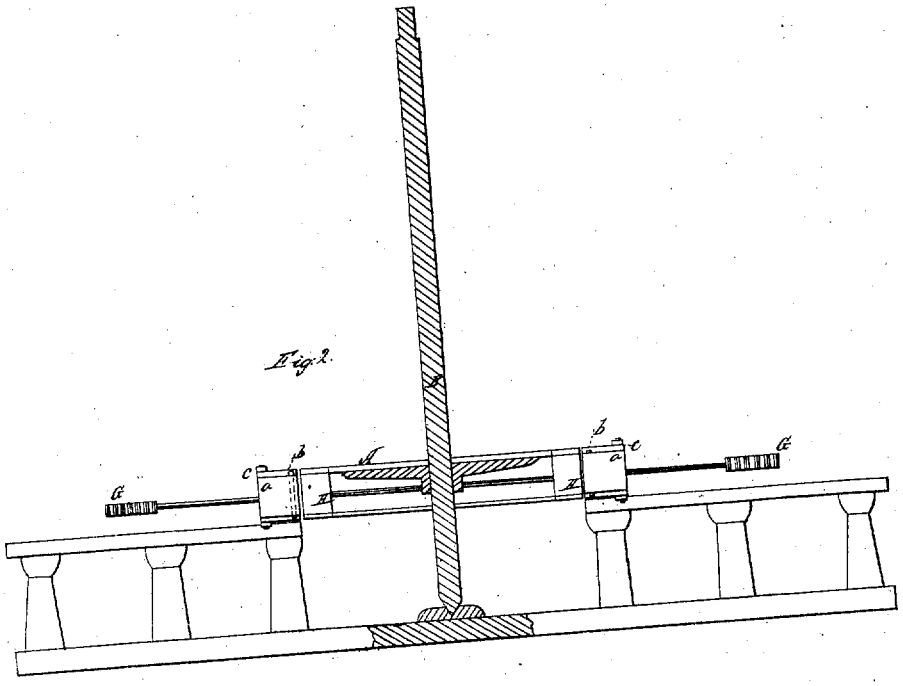

E. Roberts,

Water Wheel,

No. 2,062.

Reissued Aug. 29, 1865.

UNITED STATES PATENT OFFICE.

ATLAS L. STOUT, WILLIAM M. MILLS, AND JOHN TEMPLE, OF DAYTON, OHIO, ASSIGNEES, BY MESNE ASSIGNMENTS, OF ELIJAH ROBERTS.

IMPROVEMENT IN GATES FOR WATER-WHEELS.

Specification forming part of Letters Patent No. 10,726, dated April 4, 1854; Reissue No. 2,062, dated August 29, 1865.

*To all whom it may concern:*

Be it known that ELIJAH ROBERTS, late of Rochester, New Hampshire, deceased, invented a new and useful Improvement in Gates for Water-Wheels, for which Letters Patent of the United States were granted to him, dated April 4, 1854, which Letters Patent were duly assigned to ATLAS L. STOUT, WILLIAM M. MILLS, and JOHN TEMPLE, of Dayton, in the State of Ohio, thereby conveying to them the full and exclusive right secured by said Letters Patent, as will appear from the records of assignments in the Patent Office. The said ATLAS L. STOUT, WILLIAM M. MILLS, and JOHN TEMPLE have surrendered said Letters Patent and requested that new Letters Patent may issue to them for the same invention for the residue of the period for which the original patent was granted, under the following amended specification, which is a full, clear, and exact description thereof, reference being had to the accompanying drawings and letters of reference thereon.

Some attempts have been made to regulate and advantageously control the water when applied to the periphery of water-wheels, but hitherto practical difficulties have presented themselves, which it is the object of this improvement to overcome. In those wheels where the flow of water has been regulated by rising and falling gates there is a manifestly improper effect produced in the direction of and change of form given to the sheet of water as it passes to the vanes or buckets of the wheel. In that class of wheels referred to the water is forced upon the buckets in the direction toward the center of the wheel, whereas by the use of this invention the water is caused to exert its greatest active force or percussive action in a line tangent to the periphery of the wheel in such manner as to strike the face of the buckets, which are placed nearly at right angles to the chute or gateway through which the current of water is directed.

In using this wheel casing or curb, with its several gates arranged around it so as to open horizontally by a simple mechanism which opens them simultaneously to any desired extent, the effect is to cause all of the buckets of the wheel to be constantly acted upon by the flow of water in the same manner as the several buckets of the overshot-wheel are filled alternately by the sheet of water which actuates and drives that wheel. The quantity of water supplied to the wheel may be readily varied to afford power for any given purpose. It will be observed that the gates are so connected by means of rods with the mechanism for opening them that in the event that an obstruction is accidentally introduced so as to prevent one or more of the gates from being readily closed by hydrostatic pressure, it will not prevent the other gates from being instantly closed when the gate-operating mechanism is adjusted for that purpose. Although the gates are caused to be simultaneously and uniformly opened, they are capable of closing separately by the pressure of the surrounding body of water.

The nature of this invention of the said ELIJAH ROBERTS consists in arranging a series or set of gates exterior to the incasing or curb of a submerged water-wheel in combination with suitable mechanism for opening them horizontally, simultaneously, and uniformly to the desired extent at one operation for the ingress of the water for actuating the wheel within the curb, whereby the quantity of water introduced upon the buckets of the wheel may be varied, increased, or diminished from time to time to furnish the necessary speed and power for different kinds of work, and whereby the water is caused to pass in a direction nearly tangential to the periphery of the wheel, and in a line at right angles to the face of the buckets near the circumference of the wheel.

For the purposes of economy in construction and use, as well as to secure uniformity of action of the gates, the width of the chutes being simultaneously regulated thereby at all times, the mechanism by which the gates are opened to any desired extent is so connected as to be capable of use at a single operation above the water-line. This will be seen to be important when it is understood that the whee with its surrounding curb and gates is deeply submerged in a penstock.

In the use of two or more mechanisms for actuating the gates, as has been proposed, each requiring separate action, it is impractical to obtain either uniformity, regularity, or simultaneous action of the gates.

Figure I of the drawings represents a top view of the gates surrounding a wheel and the mechanism for operating them. Fig. II is a vertical cross section.

In the drawings, A A denote a wheel of the usual form. The vanes or buckets D′ D′ D′ should be so placed as to receive the direct action of the water from the chutes. The water enters through the chutes around the wheel and is discharged through the center vent of the wheel below. The upper side of the wheel being closed, the water is forced upon the buckets, as has been herein described. The incasing or curb surrounding and covering the wheel is stationary, thereby leaving the wheel free to be acted upon by the water which passes the chutes.

B denotes the vertical shaft, and *c c* the rims, which are sufficiently wide to retain the gates *a a* between their edges. These chute-gates are perforated with holes, in which the rods *b b* pass freely, and serve as a hinge.

E E is an annular ring, provided with cogs *e e* upon its periphery, only on its opposite sides, as seen in Fig. I. This annular ring is supported in position by grooves which it enters in the rollers F F, and is free to be actuated by a suitable pinion, G, meshing into the cogs *e e*. The pinions G are on vertical shafts I I, upon the heads of which are placed pinions H H.

J J is a horizontally-placed shaft crossing the penstock above the water-line, and having near its ends the screw-gear *f f*, meshing into cogs *g g* of the upper pinions, H H.

D D D are the rods, furnished with a bolt-hole at one end to fit over pins *h h* on the ring E E, and the other end of the rod is furnished with a head or screw-nut. This rod passes freely through a hole in the outer end of the chute-gate *a a*. By revolving the shaft J J by means of hand levers or cranks at the ends thereof the screw-gear *f f* thereon will cause the ring E E to move in its bearings and actuate the gates by means of the connecting-rods D D D, the intermediate pinion, G, being brought into action, as represented. By this mechanism the gates *a a a* may be opened to any desired extent.

Having fully described this invention and its mode of operation, what is claimed as the invention of the said ELIJAH ROBERTS is—

1. The combination of a ring and rods with suitable mechanism for simultaneously and uniformly opening a series of gates of submerged center-vent water-wheels at a single operation above the water-line, whereby the water admitted to the wheel may be easily regulated, substantially as described.

2. Connecting the rods with the gates so that the former may freely slide through the latter in the manner described, to permit the gates to be closed by hydrostatic pressure, for the purpose specified.

ATLAS L. STOUT,
WILLIAM M. MILLS,
JOHN TEMPLE,
*Of the firm of Stout, Mills & Temple.*

Witnesses:
H. R. K. PECK,
J. B. LEFFERSON.